US012006731B2

(12) United States Patent
Leiponis et al.

(10) Patent No.: US 12,006,731 B2
(45) Date of Patent: Jun. 11, 2024

(54) TOUCHLESS, PUSHBUTTON EXIT DEVICES, SYSTEMS AND METHODS THEREOF

(71) Applicant: Parabit Systems, Inc., Roosevelt, NY (US)

(72) Inventors: Robert J Leiponis, Glen Cove, NY (US); Danny Kopit, Brooklyn, NY (US)

(73) Assignee: Parabit Systems, Inc, Roosevelt, NY (US)

( * ) Notice: Subject to any disclaimer, the term of this patent is extended or adjusted under 35 U.S.C. 154(b) by 261 days.

(21) Appl. No.: 17/563,120

(22) Filed: Dec. 28, 2021

(65) Prior Publication Data

US 2022/0205277 A1 Jun. 30, 2022

Related U.S. Application Data

(60) Provisional application No. 63/131,861, filed on Dec. 30, 2020.

(51) Int. Cl.
*E05B 47/00* (2006.01)

(52) U.S. Cl.
CPC .. *E05B 47/0046* (2013.01); *E05B 2047/0067* (2013.01)

(58) Field of Classification Search
CPC ..................... E05B 47/0046; E05B 2047/0067
See application file for complete search history.

(56) References Cited

U.S. PATENT DOCUMENTS

| | | | | |
|---|---|---|---|---|
| 4,503,504 | A * | 3/1985 | Suzumura | B60R 1/07 280/775 |
| 5,642,731 | A * | 7/1997 | Kehr | G07F 11/62 600/300 |
| 6,697,757 | B2 | 2/2004 | Eckel et al. | |
| 6,967,587 | B2 | 11/2005 | Snell et al. | |
| 7,068,179 | B2 | 6/2006 | Snell et al. | |

(Continued)

FOREIGN PATENT DOCUMENTS

| | | | | |
|---|---|---|---|---|
| CA | 2627110 A1 * | 10/2009 | | E05B 17/22 |
| CN | 202472778 U * | 10/2012 | | |

(Continued)

*Primary Examiner* — Chico A Foxx
(74) *Attorney, Agent, or Firm* — Michael J Porco; Gerald E Hespos

(57) ABSTRACT

The present disclosure relates to touchless, pushbutton exit devices, systems and methods thereof. A touchless, push-button exit device of the present disclosure is a touchless door-control device designed to provide both contactless, fail-safe, egress/exit control as well as push-button egress/exit control. The touchless, pushbutton exit device can be used in conjunction with a host of existing security devices (e.g., Fire, Alarm Panel, and Access Control), or as a stand-alone solution. The present disclosure provides for at least three types of exit devices, i.e., an Infrared (IR) version, a Doppler (radar) version and a low-power radar-based version. When motion is detected within a predetermined distance (e.g., about 5.5 inches for the Infrared version or about 24 inches for the Doppler version) of a faceplate of the exit device, an onboard relay is activated, providing control for intermittent as well as continuous duty locking devices.

19 Claims, 6 Drawing Sheets

IR-Based Touchless Switch

Doppler Radar Touchless Switch

(56) References Cited

U.S. PATENT DOCUMENTS

| | | | | |
|---|---|---|---|---|
| 7,924,212 | B2 | 4/2011 | Benitez et al. | |
| 8,141,296 | B2 | 3/2012 | Bem | |
| 8,169,317 | B2 | 5/2012 | Lemerand et al. | |
| 8,189,753 | B1 * | 5/2012 | Soucy, III | H04M 11/025 379/159 |
| 9,394,732 | B1 * | 7/2016 | Ahmad | E05B 1/0046 |
| 9,435,884 | B2 | 9/2016 | Inoue | |
| 9,618,918 | B2 | 4/2017 | O'Keeffe | |
| 9,909,351 | B1 * | 3/2018 | McNabb | E05B 47/0001 |
| 10,246,904 | B1 * | 4/2019 | White | E05F 15/77 |
| 10,344,502 | B2 | 7/2019 | McKibben et al. | |
| 10,354,655 | B1 | 7/2019 | White et al. | |
| 10,612,289 | B2 | 4/2020 | Ibsies | |
| 2002/0135570 | A1 * | 9/2002 | Iisaka | G06F 1/1626 345/177 |
| 2005/0073425 | A1 | 4/2005 | Snell et al. | |
| 2006/0011419 | A1 * | 1/2006 | Chuang | B66B 1/461 187/316 |
| 2006/0118039 | A1 * | 6/2006 | Cooper | B05B 12/12 118/696 |
| 2007/0013531 | A1 | 1/2007 | Hules et al. | |
| 2008/0115543 | A1 * | 5/2008 | Lanigan | E05F 15/616 70/57.1 |
| 2009/0151256 | A1 * | 6/2009 | Koncelik, Jr. | E06B 5/01 49/31 |
| 2009/0300988 | A1 * | 12/2009 | Bem | E05B 65/0035 70/101 |
| 2010/0253516 | A1 * | 10/2010 | Lemerand | E05F 15/73 340/545.1 |
| 2010/0298957 | A1 | 11/2010 | Rocha et al. | |
| 2010/0313612 | A1 * | 12/2010 | Eichenstein | E05B 41/00 70/432 |
| 2010/0315233 | A1 * | 12/2010 | Eichenstein | G08B 21/24 340/542 |
| 2011/0083476 | A1 * | 4/2011 | Yang | D06F 37/42 68/12.02 |
| 2012/0127317 | A1 | 5/2012 | Yantek et al. | |
| 2012/0140391 | A1 * | 6/2012 | Nickel | G07C 9/00944 361/679.01 |
| 2012/0168288 | A1 * | 7/2012 | Furrer | H01H 13/06 200/61.58 R |
| 2013/0041856 | A1 | 2/2013 | Benitez et al. | |
| 2013/0145692 | A1 | 6/2013 | Laird et al. | |
| 2014/0028378 | A1 * | 1/2014 | Rostamianfar | B66B 1/461 327/517 |
| 2014/0267739 | A1 * | 9/2014 | Ibsies | G07C 9/00896 348/156 |
| 2015/0124853 | A1 | 5/2015 | Huppi et al. | |
| 2015/0128667 | A1 * | 5/2015 | Yoon | E05B 65/104 70/278.1 |
| 2015/0353033 | A1 * | 12/2015 | Pribisic | H03K 17/962 307/115 |
| 2017/0076157 | A1 | 3/2017 | Vazquez et al. | |
| 2017/0328777 | A1 | 11/2017 | Zeckendorf et al. | |
| 2018/0011567 | A1 * | 1/2018 | Den Boer | G06F 3/0445 |
| 2018/0016836 | A1 * | 1/2018 | Ibsies | E05F 15/74 |
| 2018/0052452 | A1 * | 2/2018 | Kimura | G05B 19/4183 |
| 2018/0330168 | A1 | 11/2018 | Wang et al. | |
| 2019/0017299 | A1 * | 1/2019 | Capalau | E05B 77/30 |
| 2019/0024412 | A1 * | 1/2019 | Lammers | E05B 15/0205 |
| 2019/0226190 | A1 * | 7/2019 | Grody | E03D 5/105 |
| 2020/0279445 | A1 * | 9/2020 | Min | G06V 10/143 |
| 2020/0309488 | A1 * | 10/2020 | Batiste | E05C 19/166 |
| 2021/0063560 | A1 * | 3/2021 | Bosse | G01S 13/60 |
| 2021/0065530 | A1 * | 3/2021 | Fairweather | E01F 9/30 |
| 2021/0276714 | A1 * | 9/2021 | Dwaraganathan | B64D 11/003 |
| 2021/0304586 | A1 * | 9/2021 | Deng | G08B 27/003 |
| 2021/0354953 | A1 * | 11/2021 | Sheu | B66B 1/468 |
| 2021/0363798 | A1 * | 11/2021 | Subramanian | E05C 9/041 |
| 2021/0363811 | A1 * | 11/2021 | Subramanian | E05B 65/0035 |
| 2022/0010583 | A1 * | 1/2022 | Brenner | G09F 3/00 |
| 2022/0136305 | A1 * | 5/2022 | Elwine | E05B 47/0046 49/334 |
| 2023/0228143 | A1 * | 7/2023 | Stern | E05F 15/63 49/27 |

FOREIGN PATENT DOCUMENTS

| | | | | |
|---|---|---|---|---|
| EP | 2894785 | A1 * | 7/2015 | G01R 27/26 |
| EP | 3940510 | A2 * | 1/2022 | B64C 1/1407 |
| WO | WO-2011019406 | A2 * | 2/2011 | E05B 17/22 |

* cited by examiner

IR-Based Touchless Switch

Doppler Radar Touchless Switch

EXIT DEVICE REAR
(APPLIES TO BOTH THE DOPPLER RADAR AND IR DETECTION UNITS)

TOUCHLESS, PUSHBUTTON EXIT DEVICES, SYSTEMS AND METHODS THEREOF

PRIORITY

This application claims priority to U.S. Provisional Patent Application Ser. No. 63/131,861, filed Dec. 30, 2020, the contents of which are hereby incorporated by reference in its entirety.

BACKGROUND

Field

The present disclosure relates generally to devices and systems for controlling entry and/or exit through a barrier, such as a door, and more particularly, to touchless, push-button exit/entry devices, systems and methods thereof.

Description of the Related Art

Barriers such as doors and gates generally require user input to operate the barrier. Most barriers are opened and closed manually through direct user contact. For example, a typical door may require a user to turn a door knob or handle or simply exert force on the door itself. Barriers may also be automated. To open an automatic door, for example, a user typically must press a button or input a code on a touchpad. Such automated doors may be implemented for convenience or security purposes or to assist those with physical handicaps. Regardless of the method of opening, these barriers generally require a user to make direct physical contact, generally by hand, with the barrier or a connected device.

In nearly every environment, user contact with a surface can result in the spreading of undesirable microorganisms, such as germs. Germs may be spread from the user to the surface and vice versa. Repeated user contact with such a surface contributes to the spreading of these germs to others who contact the surface. For example, a user wishing to open a door of a public facility must typically turn a door handle in order to open the door. Repeated opening and closing of the door can result in a buildup of germs on the handle. Any user who contacts the handle is exposed to the germs.

Because it is known that germs may be spread through contact with common objects, various systems have been developed to reduce the spreading of germs. For example, many public facilities such as public restrooms now have automated water and soap dispensers that allow users to wash their hands without making contact with any surfaces. While such systems are effective in sanitizing a user's hands, their effectiveness is short-lived as a user must then touch a door or door handle to open the door and exit the restroom. Depending on the hygiene of previous users, germs from that door or door handle may be spread to even those users who take care to sanitize their hands.

Thus, a need exists for devices, systems, and methods for touchless controlling of an entry/exit barrier.

SUMMARY

The present disclosure relates to touchless, pushbutton exit/entry devices, systems and methods thereof.

In one aspect, a touchless, pushbutton exit/entry device of the present disclosure is a touchless door-control device designed to provide both contactless, fail-safe, egress/exit control as well as push-button egress/exit control. The touchless, pushbutton exit device can be used in conjunction with a host of existing security devices (e.g., Fire, Alarm Panel, and Access Control), or as a stand-alone solution. The present disclosure provides for at least three types of exit devices, i.e., an Infrared (IR) version, a Doppler (radar) version, and a low-power radar-based version. When motion is detected within a predetermined distance (e.g., about 5.5 inches for the Infrared version or about 24 inches for the Doppler version) of a faceplate of the exit device, an onboard relay is activated, providing control for intermittent as well as continuous duty locking devices.

According to one aspect of the present disclosure, a device for controlling opening and closing of a barrier includes a face plate including a front surface and a rear surface; a proximity detector disposed on the front surface of the face plate that detects an object within a predetermined distance of the proximity detector, an output of the proximity detector coupled to a controller; a pushbutton disposed on the front surface of the face plate having an open state and a closed state, the button coupled to the controller; and the controller coupled to a lock control device, the lock control device enables a barrier to be opened or closed, wherein upon receiving an output from the proximity detector that an object was detected or an input from the pushbutton changing from the open state to the closed state, the controller activates the lock control device to enable the barrier to be open.

In another aspect, the controller is coupled to the lock control device via a relay.

In a further aspect, the lock control device is at least one of a magnetic lock and/or a door strike.

In one aspect, the device further includes an indicator disposed on the face plate that indicates an operating state of the device.

In another aspect, the device further includes an audio output device that provides an audible indication that the barrier is enabled to be opened.

In yet another aspect, the device further includes a communication module that enables two-way communication with an external device.

In one aspect, the communication module operates by hardwire and/or wireless connectivity.

In a further aspect, the proximity detector is a passive infrared sensor.

In still another aspect, the proximity detector is a doppler sensor.

In one aspect, a detection distance of the doppler sensor is adjustable.

In a further aspect, the doppler sensor determines at least one of speed of the object, distance of object from the doppler sensor, an angle from object to the doppler sensor and/or a position of the object.

In yet another aspect, the device further includes a communication module that enables two-way communication with an external device.

In one aspect, the pushbutton is further configured to interrupt power to the lock control device when depressed.

In a further aspect, the device further includes an override input coupled to the controller for providing an input signal to the controller, wherein upon receiving the input signal from the override input, the controller activates the relay to enable the barrier to be open.

In one aspect, the override input is configured to be coupled to a switching device disposed externally from the device.

In another aspect, the device further includes an indicator disposed on the face plate that indicates an operating state of the device, wherein the operating state includes at least one of a standby state, open state and/or override state.

In yet another aspect, an antimicrobial film is disposed on the face plate and pushbutton.

In a further aspect, the device further includes a display and at least second and third pushbuttons coupled to the controller for programming the device.

In another aspect, the display and at least second and third pushbuttons are disposed on a substrate coupled to the rear surface of the face plate.

In yet another aspect, the proximity detector is a low-power radar-based sensor.

BRIEF DESCRIPTION OF THE DRAWINGS

The above and other aspects, features, and advantages of the present disclosure will become more apparent in light of the following detailed description when taken in conjunction with the accompanying drawings in which.

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. Herein, the phrase "coupled" is defined to mean directly connected to or indirectly connected with through one or more intermediate components. Such intermediate components may include both hardware and software-based components.

It will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The present disclosure relates to devices, systems and methods for controlling entry and/or exit through a barrier, such as a door, and more particularly, to touchless, pushbutton exit/entry devices, system using such exit devices and methods thereof.

The touchless, pushbutton exit device of the present disclosure is a touchless door-control device designed to provide both contactless, fail-safe, egress/exit control as well as push-button egress/exit control. The touchless, pushbutton exit device can be used in conjunction with a host of existing security devices (e.g., Fire, Alarm Panel, and Access Control), or as a stand-alone solution. The present disclosure provides for at least three types of exit devices, i.e., an Infrared (IR) version, a Doppler (radar) version and a low-power radar-based version. When motion is detected within a predetermined distance (e.g., about 5.5 inches for the Infrared version or about 24 inches for the Doppler version) of a faceplate of the exit device, an onboard relay is activated, providing control for intermittent as well as continuous duty locking devices. Both normally-open and normally-closed contacts allow power to be applied or disconnected based on the electric door-lock design. Open-lock time delays can be configured or adjusted from about 5 to 120 seconds. The dual tech door control device of the present disclosure can be powered from any supply source having a voltage output from +12 VDC up to +24 VDC.

Figure 1A:
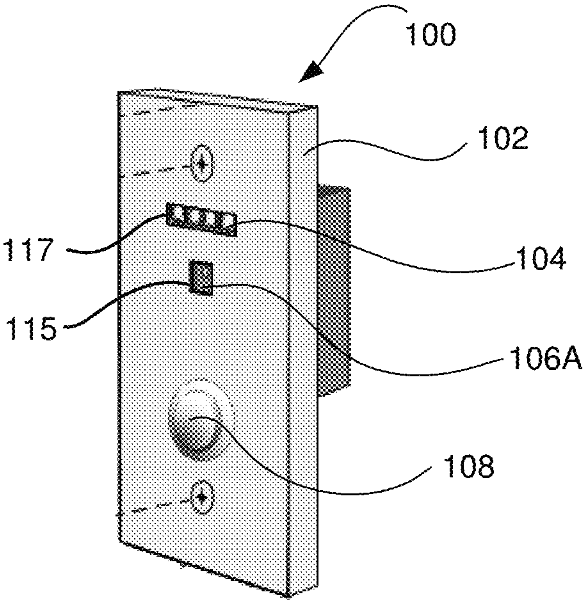
FIG. 1A is a perspective view of a touchless, pushbutton exit device in accordance with an embodiment of the present disclosure.
Figure 1B:
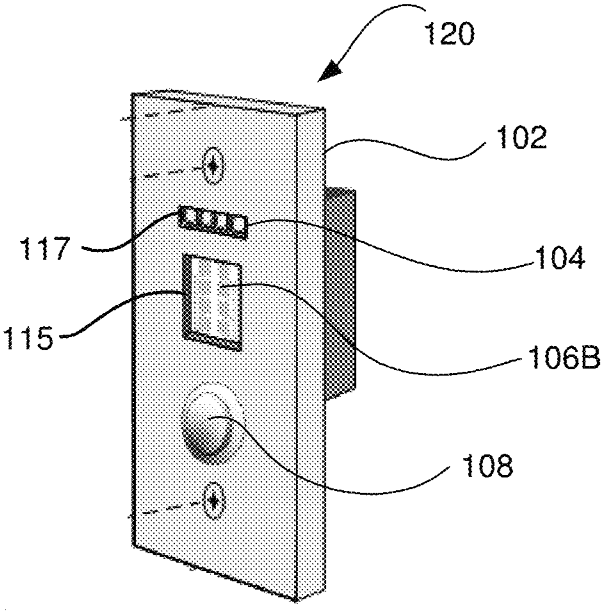
FIG. 1B is a perspective view of a touchless, pushbutton exit device in accordance with another embodiment of the present disclosure.

Referring to FIG. 1A, an exit device 100 is illustrated in accordance with an embodiment of the present disclosure. The exit device 100 includes a generally rectangular plate 102, a LED array indictor 104, a proximity detector 106A and a pushbutton 108. The device 100 is configured to be located in close proximity to the barrier, e.g., door, the device 100 is controlling to provide control of the barrier via the proximity detector 106A or pushbutton 108 and to provide a visual indication of the status of the device 100 via the LED array indictor 104. In operation, the proximity detector 106A detects an approaching user and the exit device 104 takes the appropriate action to control the barrier without the user actually touching the exit device 100. Additionally, the user may active control of the barrier by pushing the pushbutton 108. In the embodiment shown in FIG. 1A, the exit device 100 employs an infrared proximity detector 106A to detect motion of a user. In another embodiment, the exit device 100 employs a radar motion detector 106B to detect motion of a user, as shown in FIG. 1B.

Figure 1C:
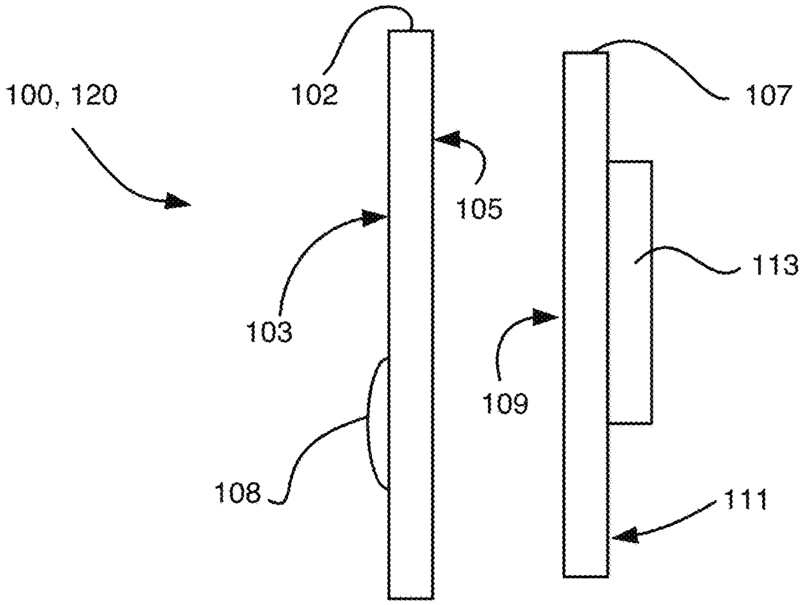
FIG. 1C is a side exploded view of a touchless, pushbutton device in accordance with an embodiment of the present disclosure.
Figure 1D:
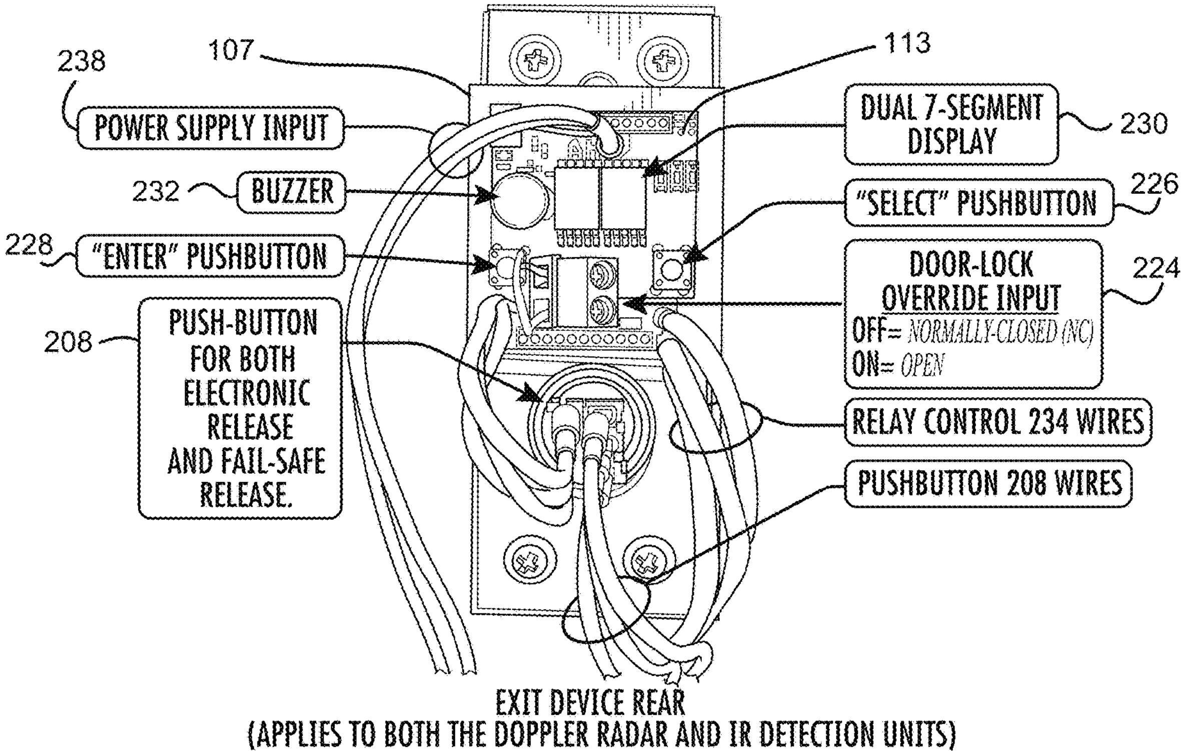
FIG. 1D is a rear view of a touchless, pushbutton device in accordance with an embodiment of the present disclosure.

FIG. 1C illustrates a side exploded view of an exit device 100, 120 of the present disclosure and FIG. 1D illustrates a rear view of an exit device 100, 120 of the present disclosure. It is to be appreciated that the side view of FIG. 1C and the rear view of FIG. 1D may apply to either version of the exit devices 100, 120. Referring to FIG. 1C, the exit device 100, 120 includes face plate 102. The face plate 102 includes a front surface 103 and a rear surface 105. As will be described below, a substrate 107 having a front surface 109 and rear surface 111 may be provided to support components of the device 100, 120. In one embodiment, the front surface 109 of the substrate 107 is coupled to the rear surface 105 of face plate 102. In other embodiments, a printed circuit board 113 may be coupled to the rear surface 111 of the substrate. As illustrated in FIG. 1D, as will be described below, the PCB 113 may include at least a portion of the components of the exit device 100, 120.

Figure 2:
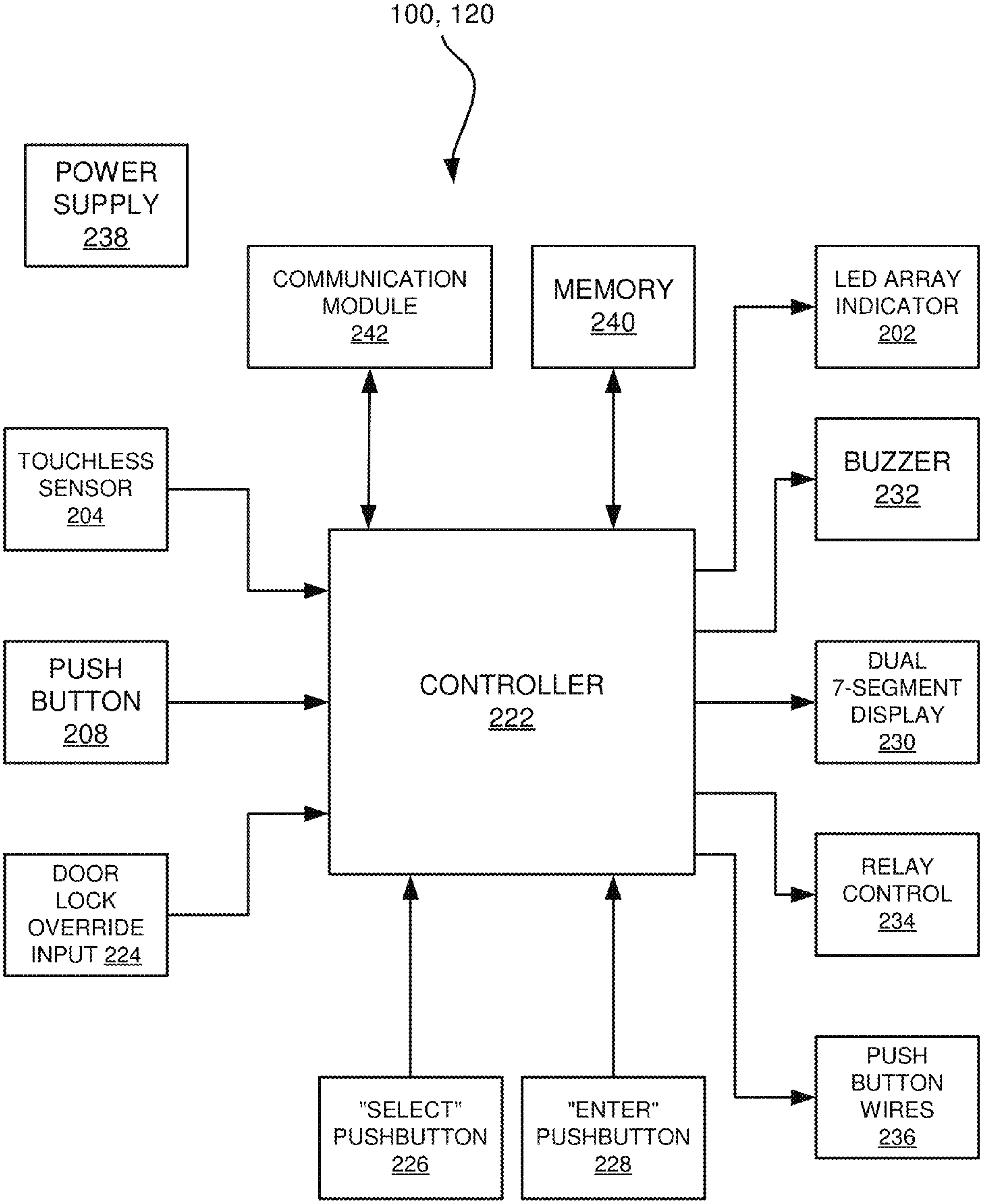
FIG. 2 is a block diagram of touchless, pushbutton exit device in accordance with an embodiment of the present disclosure.

Referring to FIG. 2, a block diagram of touchless, pushbutton exit device 100, 120 in accordance with an embodiment of the present disclosure is provided. The exit device

100, 120 includes a controller 222 for controlling the operations of the device, a touchless motion proximity sensor/detector 204, a pushbutton 208 and a door lock override input 224. It is to be appreciated that motion sensor 204 may include sensor 106A or sensor 106B. Additionally, the exit device 100 includes a "select" pushbutton 226, a "enter" pushbutton 228 and a dual 7-segment display 230 coupled to the controller 222 for user programming of parameters of the exit device 100, 120, the details of which will be described below.

Visual indicator 202 (e.g., indicator 104 shown in FIGS. 1A-1B) includes a LED array to provide visual indications of the operating state of the exit device 100, 120. An audio output 232, e.g., a buzzer, is provided to provide an audible indication that the barrier is enabled to be opened. The buzzer will emit a tone in response to a proximity (e.g., a wave of a user's hand) or pushbutton request (via pushbutton 108) for egress. A relay 234 is coupled to the controller 222 to provide a control signal, e.g., a contact closure or opening, to another device, e.g., a door strike, magnetic-lock, etc. In one embodiment, the relay 234 provides a contact closure when activated to another device, e.g., a lock control device, a controller of an external system such a fire control system, indicating that the barrier is be opened. In another embodiment, the relay 234 provides an open contact when activated to interrupt power to a lock control device to open a barrier. In certain embodiments, the relay 234 may provide an contact closure and an open contact when activated. A power supply 238 provides power to all components requiring power, whether or not an actual connection is shown in FIG. 2.

In one embodiment, the exit device 100, 120 may include a communication device or module 242 for two-way communications between the exit device 100 and an external device, e.g., a controller of a security system, a controller of a fire suppression system, another exit device, a human presence detector, etc. The communication module 242 may be a modem, network interface card (NIC), wireless transceiver, etc. The communication module 242 may perform its functionality by hardwired and/or wireless connectivity. The hardwire connection may include but is not limited to hard wire cabling e.g., parallel or serial cables, RS232, RS485, USB cable (e.g., USB-C), Firewire (1394 connectivity) cables, Thunderbolt™ cable, Ethernet, and the appropriate communication port configuration. The wireless connection may operate under any of the various wireless protocols including but not limited to Bluetooth™ interconnectivity, wireless Ethernet connectivity, near field communication (NFC) connectivity, infrared connectivity, radio transmission connectivity including computer digital signal broadcasting and reception commonly referred to as Wi-Fi or 802.11.X (where x denotes the type of transmission), satellite transmission or any other type of communication protocols, communication architecture or systems currently existing or to be developed for wirelessly transmitting data including spread spectrum 900 MHz, or other frequencies, Zigbee, and/or any mesh enabled wireless communication.

It is to be appreciated that the functions of the exit device 100, 120 shown in FIGS. 1A, 1B and 2 may be provided through the use of dedicated hardware as well as hardware capable of executing software in association with appropriate software. In one embodiment, some or all of the functions of controller 222 may be performed by at least one processor, such as a computer or an electronic data processor, digital signal processor or embedded micro-controller, field programmable gate array (FPGA), in accordance with code, such as computer program code, software, firmware, register transfer logic and/or integrated circuits that are coded to perform such functions, unless indicated otherwise. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software and/or firmware, random access memory (RAM), and nonvolatile storage.

In one embodiment, touchless sensor/detector 204 may include a passive infrared (PIR) sensor, such as sensor 106A shown in FIG. 1B. The device 100 utilizes a passive infrared sensor (PIR) 106A that measures infrared (IR) light radiating from objects in its field of view. It is a basic, low-cost solution for close wave detection. For example, sensor 106A may have an Infrared sensitivity (i.e., maximum distance) of about 5.5 inches (or about 13.9 cm). Upon sensing an object in a field of view of the infrared sensor 106A, the infrared sensor 106A sends a signal to the controller 222, where the controller 222 then transmits a further control signal to the relay 234 to enable the barrier to be open.

In another embodiment, the touchless sensor 206 may include Doppler sensor, such as sensor/detector 106B shown in FIG. 1B. The Doppler exit device 120 utilizes a 24 GHz radar sensor 106B that transmits a waveform that reflects off an object in its field of view, e.g., a waving hand of an approaching person. The reflected waveform is received, and the frequency difference is measured to detect both movement and velocity. Upon detecting movement, the Doppler sensor 106B sends a signal to the controller 222, where the controller 222 then transmits a control signal to relay 234 to enable the barrier to be opened.

In one embodiment, the doppler sensor 106B may have a Doppler Radar detection distance (i.e., a maximum detection distance) of about 49 feet (or about 15 m) with a Doppler Radar Sensitivity of: (Default 22 Db)—Configurable From 0 dB TO 34 dB. The Doppler sensor 106B can measure and/or calculate the following parameters:

- Speed/velocity (Derived from Doppler shift in frequency)
- Distance to target (Derived from measurement of electromagnetic wave)
- Angle/direction to target (Derived from phase difference at the antennas)
- Position of object In addition to employing the measured and/or calculated parameters to determine when to activate the control relay 234 to enable opening of the barrier, the parameters determined by the Doppler sensor 106B may be communicated to another device (e.g., a controller of a security system) via the communication device 242 disposed in or on the exit device 100. The parameters determined by the Doppler sensor 106B may be used in conjunction with other measured or detected parameters of a security systems to determine, for example, a number of occupants in an area, a distance between such occupants, etc.

In another embodiment, the touchless sensor/proximity detector may include a low-power radar-based sensor. The low-power radar-based sensor utilizes a 60 GHz radar sensor that transmits a waveform that reflects off an object in its field of view, e.g., a waving hand of an approaching person. The low-power radar-based sensor includes an adjustable detection distance and many similar adjustable parameters to sensor 106B. The adjustable sensitivity level enables the low-power radar-based sensor to detect human breathing (i.e., chest motion). Upon detecting movement, the low-power radar-based sensor sends a signal to the controller 222, where the controller 222 then transmits a control signal to relay 234 to enable the barrier to be opened.

The pushbutton 208 will interrupt power to the lock, overriding the electronic proximity device. Egress "open" delay (e.g., 5-120 seconds), is valid for both the proximity detector 204 as well as the push-button 208. Egress Buzzer Delay is independently adjustable from 5-120 seconds in both "touchless" and "button" modes. In one embodiment, the pushbutton 208 provides an input when pressed to the controller 222, where the controller 222 then activates the relay 234 to enable opening of the barrier. It is to be appreciated that the pushbutton 208 has an open state (i.e., when the pushbutton 208 is not depressed or its normal state) and a closed state (i.e., when the pushbutton 208 is depressed by a user). When depressed by a user, the pushbutton 208 will provide a closed contact input signal to the controller 222 indicating a request for the barrier to be open. Additionally, the pushbutton 208 may be configured to interrupt power to the locking device of the barrier via contact and wires 236 when pressed by a user. In this manner, if the exit device 100 loses power or becomes inoperable, the pushbutton 208 may still operate the associated barrier, e.g., by interrupting power to the lock control device.

It is further to be appreciated that the exit device 100 supports "fail safe" relay status. In one embodiment, the control relay 234 may be wired to the locking device via a normally-opened contact of the relay 234. In this embodiment, the controller 222 activates the relay 234 to close the normally-opened contact and provides power to the locking device of the barrier or door in a standby state. Upon receiving an indication to open the barrier or door (e.g., via sensing motion, pressing of push button 208, etc.), the controller 222 will activate the relay 234 to open the contact and interrupt power to the locking device. Additionally, upon loss of power to the exit device 100, the relay 234 will fail to the normally opened position and interrupt power to the locking device of the barrier, thus enabling opening of such barrier.

The exit device 100 contains an emergency override input 224 on the rear of the device 100, which is looped-out (OFF) by default. An external normally-closed switching device (e.g., from a fire alarm or other certified emergency system) may be inserted into the input terminal block to force the door-lock open during emergencies. When the override input 224 is opened, the controller 222 will detect the status of the input 224 and activate the relay 234 to enable opening of the barrier or door. The door-lock will remain active until the device 100 is power-cycled.

In one embodiment, the exit device plate 102 and pushbutton 108 are covered with antimicrobial film for germ free contact. The device 100 is Fail-Safe and will unlock the door if the device power is lost. The exit device is designed to fit in Mullion, Single-Gang, and Double-Gang form factors providing nearly universal adaptability. It is to be appreciated that in one embodiment at least a portion of the components shown in FIG. 2 (or in other embodiments all of the components) are disposed on a substrate, e.g., printed circuit board (PCB), mounted to a rear side of the face plate 102. The substrate or printed circuit board may be configured to fit inside one of the form factors listed above when the exit device 100 is mounted thereon. It is further to be appreciated that the face plate 102 may include apertures to allow certain components (e.g., aperture 117 for LED array indicator 104, aperture 115 for sensor 106A, 106B, etc.) to be accessible from a front facing side of the plate 102, as shown in FIGS. 1A and 1B. For example, in one embodiment, the proximity detector/sensor 106A, 106B may be mounted on the front surface 109 of substrate 107, where the face plate 102 includes an aperture 115 (or window) located in approximately the same position as the sensor 106A, 106B is mounted on the substrate 107 so the sensor 106A, 106B may detect motion near the front surface 103 of the face plate 102.

The exit device 100 has two modes of operation: 1.) General Operation—unlocking an exit door and 2.) Door-lock Override—a remote signal or local switch can set the door-lock open for an indefinite period of time.

In general operation, when the touchless, pushbutton exit device 100 is powered up, the LED array indicator 202 will be red, indicating that the exit device 100 is in the standby state, waiting for a "hand wave" across the faceplate motion sensor/detector 204, or the pushbutton 208 to be pressed. To unlock the door, a user may pass a hand across the motion sensor window 115 (including the proximity detector 106A, 106B) within a predetermined distance of the faceplate surface and/or press pushbutton 108. The LED array will change to green and the buzzer 232 will sound, indicating that the motion sensor 204 has detected a hand and has activated the door-control relay 234, unlocking the door. The LED array indicator 202 will remain green for an adjustable, period of time or "Door Open Time", e.g., 35 seconds (factory default), and the door-control relay 234 will remain active for that time. Upon termination, the controller 222 will reset the door-control relay 234 and the door will be relocked. The LED array indicator 202 will then glow red to indicate that the exit device 100 is in the standby state.

The door-lock override input 224 allows a remote signal to override the "standby" state, operate the door-control relay 234, and unlock the door. The door-lock override input 224 will operate with a dry-contact relay, a dry-contact switch or a transistorized switching device that can offer a "near-zero" resistance between the terminal block connection points of the input 224. The door-lock override input 224 is shorted across (i.e., held OFF) by default from the factory.

When a local or remote switch is connected to the door-lock override input 224, the exit device may operate as follows: 1. When the door-lock override input 224 is closed: The LED array indicator 202 will appear in the standby state (RED). The LED array indicator 202 will change to GREEN when users request a "door-open" state and will remain in that state for the preset period of time. 2. When the Door-lock Override switch is opened: The LED array indicator 202 will become half-RED and half-GREEN, the buzzer 232 will sound for 5 seconds and then remain silent and the door will unlock and remain unlocked until the door-lock override input 224 is closed. When the Door-lock Override switch is closed: The LED array indicator 202 will return to the standby state (RED), the buzzer 232 will sound for 5 seconds and then remain silent and the exit device 100 will operate normally, i.e., awaiting a wave or button press.

It is to be appreciated that any installed Fire Detector System, Alarm Panel, or Access Control system with a normally closed (NC) output relay can be wired to the door-lock override input 224. When the integrated output from the Fire System, Alarm Panel, or Access Control system changes state from a closed loop to an open loop, the output relay will override the normal door function, and unlock all associated door locking devices for as long as the integrated output remains in an open loop condition (i.e., Lock is disengaged and the ½ RED/½ GREEN LED array indicator 202 on the Touchless/Push-Button Exit Device 100 remains on).

Figure 3:
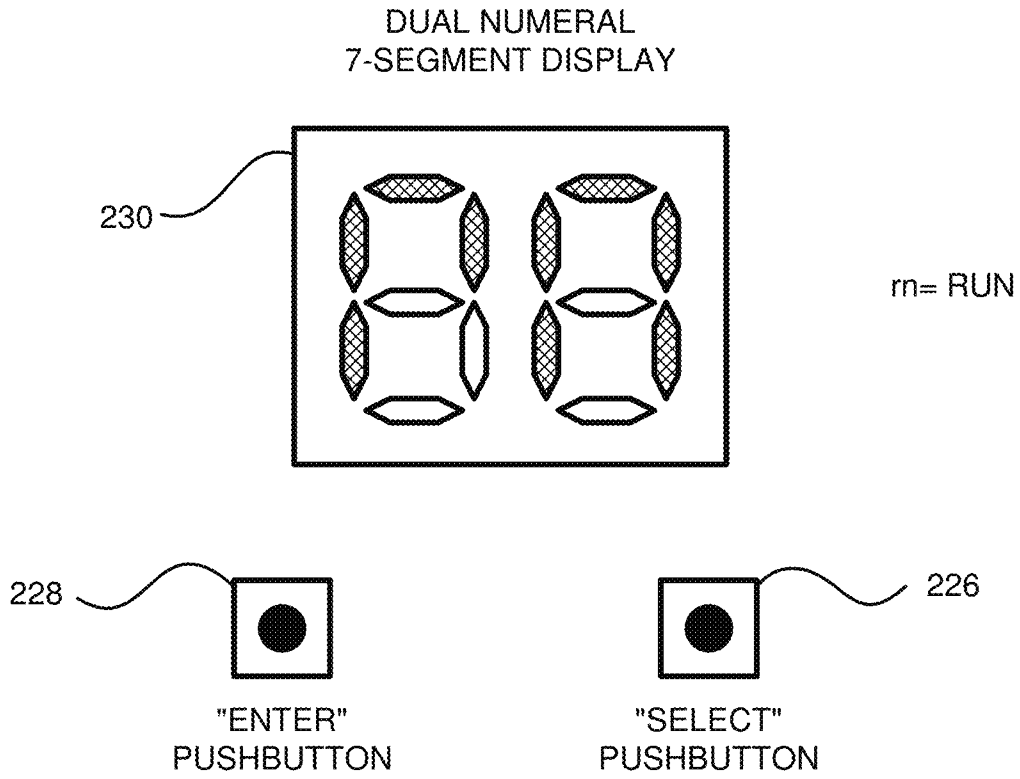
FIG. 3 illustrates a dual display used for programming an exit device in accordance with an embodiment of the present disclosure.

The touchless, pushbutton exit device 100, 120 may can be programmed for time delay and sensitivity using 2 push-button switches labeled "SELECT" 226 and "ENTER" 228 located on the back of the exit device 100 while observing the dual 7-segment display 230. It is to be appreciated that the pushbuttons 226, 228 and the display 230 may be disposed on a substrate 107 or PCB 113 as described above, where the pushbuttons 226, 228 and the display 230 would face in a direction opposite the front face of the face plate 102. The display 230 shows the programming status and allows for quick and easy setup. When the device 100, 120 is powered up, the display will show r n "run" as illustrated in FIG. 3. This indicates that the device 100, 120 is operational and ready to program. The programming mode enables the following parameters to be selected and/or adjusted:

Radar Sensitivity—sensitivity levels from "00" to "09".

PIEZO Buzzer Operation (Enable/Disable)

Front Button Door-Open Timer "EP"

The Door-Open Timer adjustment sets the delay time for the door-control relay 234. The setting determines how long the relay 234 will remain active after a user pushes the metal pushbutton 208 on the face of the exit device 100, 120 and is a safety feature in case the Doppler radar sensor 106B fails. The delay time settings are presented in increments of 5 seconds, starting with "00"=5 seconds and extending to "23"=120 seconds. Settings are placed in non-volatile memory 240.

Front Button Door-Open PIEZO Timer "FP"

The Door-Open PIEZO Timer adjustment sets the ON-time delay for the PIEZO buzzer 232 that is activated when the metal pushbutton 208 is used energize the door-control relay 234. The delay time settings are presented in increments of 5 seconds, starting with "00"=5 seconds and extending to "23"=120 seconds.

Wave Door-Open Timer "CP"

The Wave Door-Open Timer adjustment sets the OPEN-time delay for door-control relay 234 that is activated when a user approaches the face-panel of the exit device 100, 120. The delay time settings are presented in increments of 5 seconds, starting with "00"=5 seconds and extending to "23"=120 seconds.

Wave Door-Open PIEZO Timer "dP"

The Wave Door-Open PIEZO Timer adjustment sets the ON-time duration for the PIEZO buzzer 232 that is activated when a user approaches the face-panel of the exit device 100 and the door-control relay 234 has been signaled to activate. The delay time settings are presented in increments of 5 seconds, starting with "00"=5 seconds and extending to "23"=120 seconds.

DOOR-OPEN OVERRIDE PIEZO Timer "bP"

The Door-Open Override PIEZO Timer adjustment sets the OFF-time delay for the PIEZO buzzer 232 that is activated when a user signals the system to open a door, whether it be by a wave or the metal push-button 208. The PIEZO buzzer 232 issues a "chirping" (250 msec) sound every 5 seconds, by default. If a "Door-Open" switch is used to open the OVERRIDE input terminal block (on the rear of the exit device), the front-panel LED 202 display will flash, and the PIEZO buzzer 232 will chirp every 5 seconds, by default. This delay can be expanded, in 5-second increments, up to 120 seconds It is to be appreciated that the exit device 100, 120 of the present disclosure may be programmed by an external device, e.g., a computer, tablet, mobile phone, etc., in lieu of employing the pushbuttons 226, 228 and the display 230. In one embodiment, a programming application may execute on the external device, where the external device is coupled to the exit device 100, 120 via the communication module 242. The various adjustable parameters described above may be adjusted via the external device and stored in memory 240. In one embodiment, the communication module 242 includes a port or connector (as described above) and the external device is coupled to the communication module 242 via an appropriate cable, for example, the communication module 242 include a USC port and the external device is coupled to the USB port via a USB cable. In another embodiment, the communication module 242 operates under the various wireless protocols described above and the adjusting of parameters is conducted via over-the-air (OTA) programming.

The touchless, pushbutton exit device of the present disclosure shall be installed on the egress side of a door approximately 40-48 inches (1-1.2 m) vertically above the floor and within 60 inches (1.5 m) of the secured door openings. After power is applied to the exit device 100, the door-control relay 234 will become active and will remain normally-active until an egress request is applied. When operated, the manual release device shall result in direct interruption of power to the electrical lock—independent of the locking system electronics—and the lock shall remain unlocked for not less than 30 seconds. (Door-lock "Open" Delay when set for factory default.)

Figure 4:
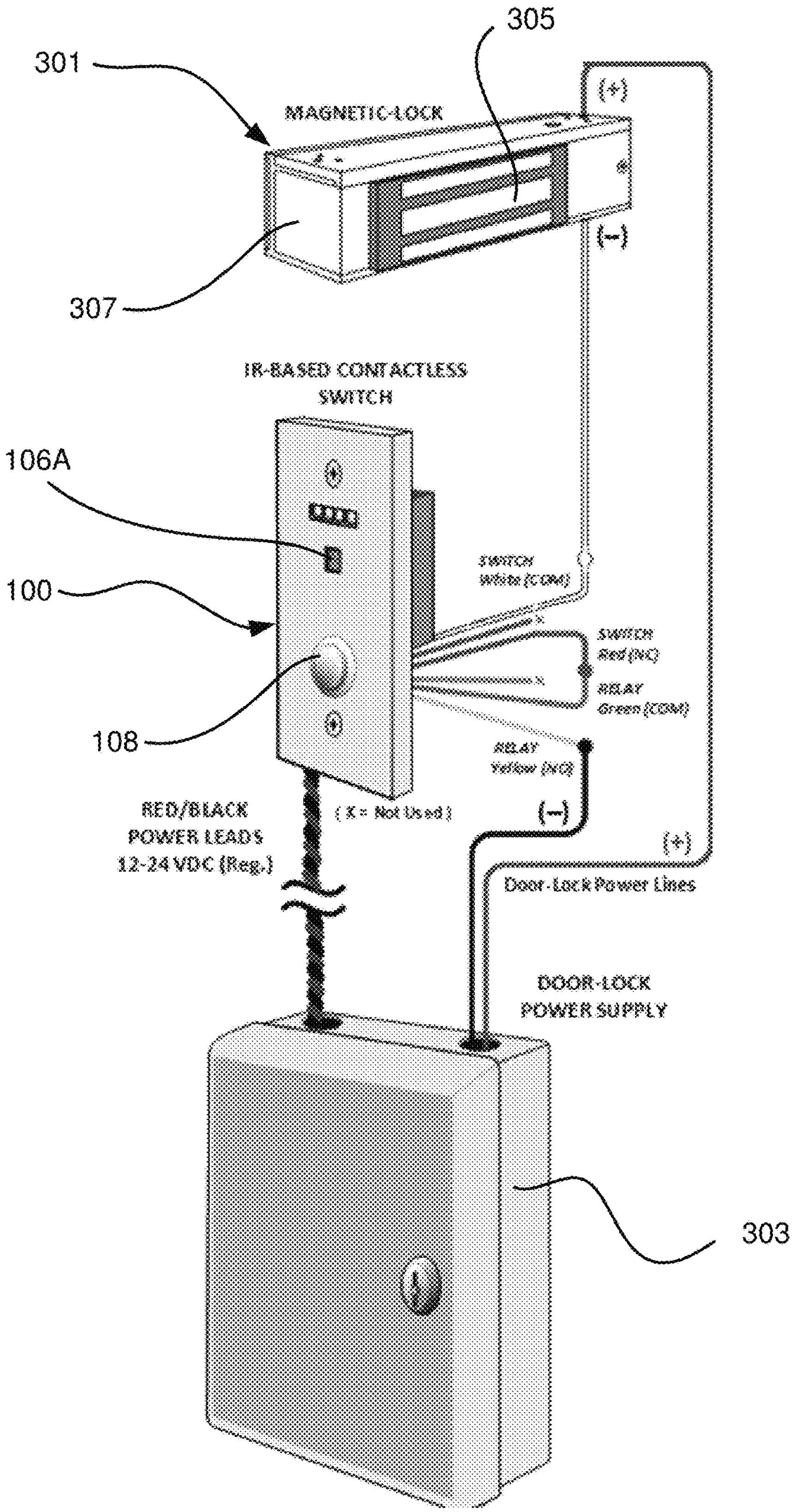
FIG. 4 is a system including an exit device controlling a magnetic lock in accordance with an embodiment of the present disclosure.

FIG. 4 is a system 300 including an exit device 100 controlling a lock control device (e.g., a magnetic lock 301) in accordance with an embodiment of the present disclosure. System 300 may include either exit device 100 (i.e., infrared) or exit device 120 (i.e., Doppler). System 300 further includes a power supply 303 which provides power to the exit device 100 and the magnetic lock 301. The magnetic lock includes an electromagnet 305 mounted in a housing 307 and an armature plate (not shown). The armature plate is attached to the barrier or door, and the housing 307 to the door frame. Generally, when power is applied to the magnetic lock 301, the electromagnet 305 is activated and attracts the plate, thus keeping the barrier locked or closed. When power is removed or interrupted, electromagnet 305 is deactivated, allowing the barrier or door to be open. When wired as shown in FIG. 4, one leg of power is provided to the magnetic lock 301 via the power supply 303 and the other leg of power runs through the exit device 100. Upon the controller 222 receiving an indication that the barrier should be enabled to open (e.g., detecting motion by sensor 106A, pressing of pushbutton 108, opening of override input 224), the controller 222 will activate relay 234 to interrupt power to the magnetic lock 301, e.g., open contact wired between green wire (common) and yellow wire (normally-open) of relay 234. Additionally, the pushbutton 108 may interrupt power to the locking device 301 by opening a contact between white wire (common) and red wire (normally-closed) of the pushbutton 108, as shown in FIG. 4.

Figure 5:
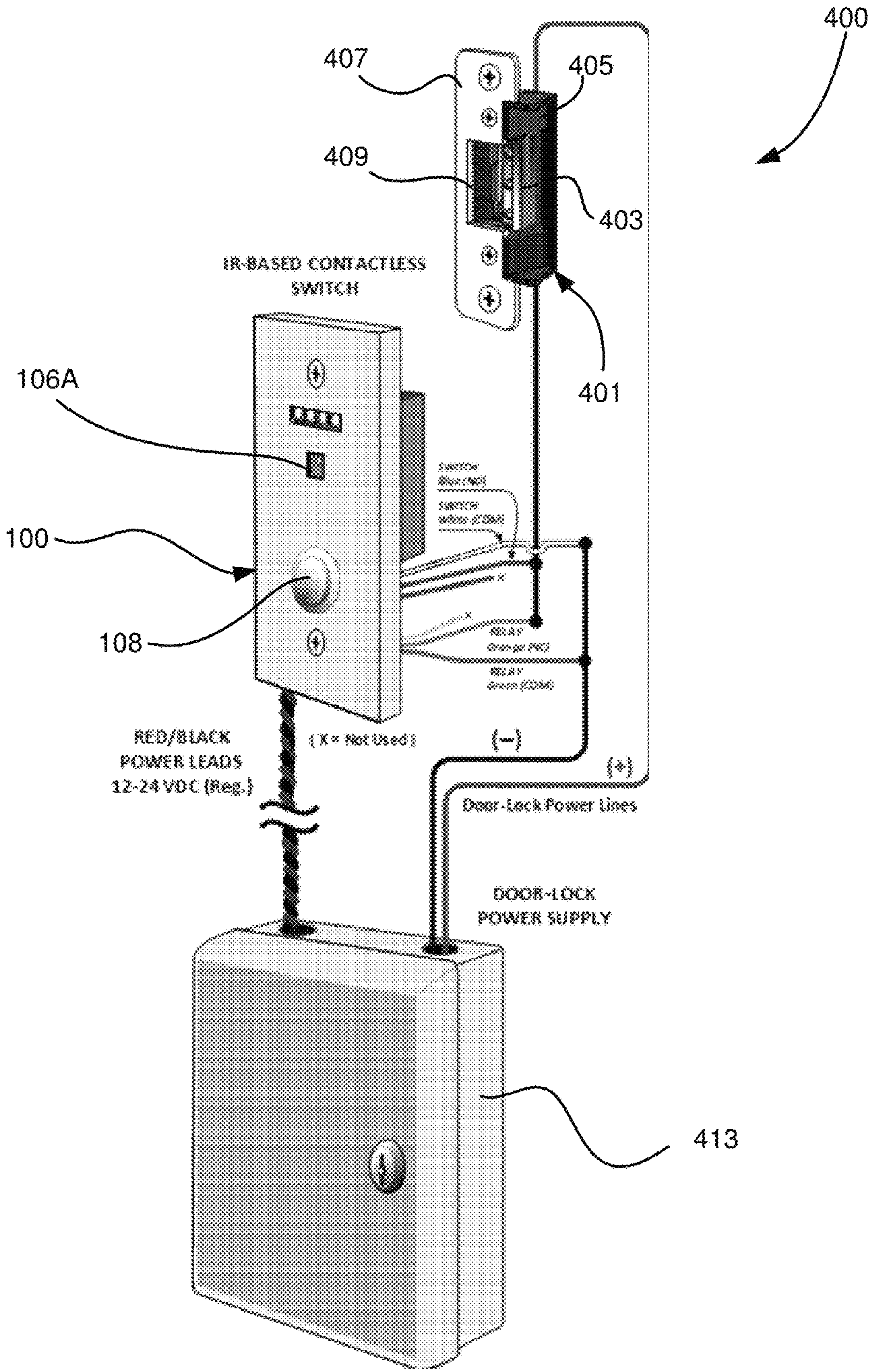
FIG. 5 is a system including an exit device controlling a door strike in accordance with an embodiment of the present disclosure.

FIG. 5 is a system including an exit device 100 controlling a lock control device (e.g., a door strike 401) in accordance with an embodiment of the present disclosure. System 400 may include either exit device 100 (i.e., infrared) or exit device 120 (i.e., Doppler). System 400 further includes a power supply 413 which provides power to the exit device 100 and the door strike 401. The door strike 401 includes a pivoting latch 403 mounted in a housing 405 which is typically mounted to a door strike plate 407. The housing 405 and plate 407 are mounted to a barrier or door frame.

The plate 407 includes an aperture 409 for receiving a bolt, e.g., a dead bolt, of a corresponding lock mounted on a door. Generally, when the latch 403 of the door strike 401 is activated, the bolt is retained in the aperture 409 thus securing the barrier or door; and, when the latch 403 is deactivated, the latch 403 pivots open to allow the bolt to move from the aperture and thus open the barrier or door.

It is to be appreciated that exit device 100 shown in FIG. 5 works the same way as the exit device 100 shown in FIG. 4 except the appropriate relay contact is chosen that allows the door strike 401 to become active when the door is to be opened. Unlike the magnetic lock 301 (which is locked when power is applied), the door strike 401 requires power to open the door. The relay 234 on the exit device 100 has a common contact (green wire), a normally-open contact (yellow wire), and a normally-closed contact (orange wire). As shown in FIG. 5, the door strike 401 is wired to the normally-closed contact, i.e., between the orange and green wire, of the relay 234. Upon the controller 222 receiving an indication that the barrier should be enabled to open (e.g., detecting motion by sensor 106A, pressing of pushbutton 108, opening of override input 224), the controller 222 will activate relay 234 to supply power to the door strike, e.g., close contact wired between green wire (common) and orange wire (normally-closed) of relay 234. Additionally, the pushbutton 108 may supply power to the door strike 401 by closing a contact between white wire (common) and blue wire (normally-opened) of the pushbutton 108, as shown in FIG. 5.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure as defined by the appended claims.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A device for controlling opening and closing of a barrier comprising:

a face plate including a front surface and a rear surface, the face plate configured for mounting the device adjacent the barrier;

a proximity detector disposed on the front surface of the face plate that detects an object within a predetermined distance of the proximity detector, an output of the proximity detector coupled to a controller and configured for providing an indication that an object was detected;

a pushbutton disposed on the front surface of the face plate having an open state and a closed state, the button coupled to the controller and configured to receive an input from a user adjacent the barrier;

an override input coupled to the controller for providing an override signal to the controller, the override input configured to receive and input from a switching device disposed externally from the device; and the controller coupled to a lock control device, the lock control device enables a barrier to be opened or closed, wherein upon receiving an output from the proximity detector that an object was detected, an input from the pushbutton changing from the open state to the closed state or the override signal from the override input, the controller activates the lock control device to enable the barrier to be open.

2. The device of claim 1, wherein the controller is coupled to the lock control device via a relay.

3. The device of claim 2, wherein the lock control device is at least one of a magnetic lock and/or a door strike.

4. The device of claim 2, wherein upon receiving the override signal from the override input, the controller activates the relay to enable the barrier to be open.

5. The device of claim 4, further comprising an indicator disposed on the face plate that indicates an operating state of the device, wherein the operating state includes a standby state, open state and/or override state.

6. The device of claim 1, further comprising an indicator disposed on the face plate that indicates an operating state of the device.

7. The device of claim 6, further comprising an audio output device that provides an audible indication that the barrier is enabled to be opened.

8. The device of claim 1, further comprising a communication module that enables two-way communication with an external device.

9. The device of claim 8, wherein the communication module operates by hardwire and/or wireless connectivity.

10. The device of claim 1, wherein the proximity detector is a passive infrared sensor.

11. The device of claim 1, further comprising an antimicrobial film disposed on the face plate and pushbutton.

12. The device of claim 1, further comprising a display and at least second and third pushbuttons coupled to the controller for programming the device.

13. The device of claim 12, wherein the display and at least second and third pushbuttons are disposed on a substrate coupled to the rear surface of the face plate.

14. The device of claim 1, wherein the proximity detector is a low-power radar-based sensor.

15. The device of claim 1, further comprising an indicator disposed on the face plate that indicates an operating state of the device, wherein the operating state includes a standby state, open state and override state.

16. A device for controlling opening and closing of a barrier comprising:

a face plate including a front surface and a rear surface, the face plate configured for mounting the device adjacent to the barrier;

a proximity detector disposed on the front surface of the face plate that detects an object within a predetermined distance of the proximity detector, an output of the proximity detector controller;

a pushbutton disposed on the front surface of the face plate having an open state and a closed state, the button coupled to the controller; and the controller coupled to an external lock control device, the lock control device enables the barrier to be opened or closed, wherein upon receiving an output from the proximity detector that an object was detected or an input from the pushbutton changing from the open state to the closed state, the controller activates the external lock control device to enable the barrier to be open, wherein the proximity detector is a doppler sensor, the doppler sensor determines a speed of the object, distance of object from the doppler sensor, an angle from object to the doppler sensor and a position of the object relative to the doppler sensor.

17. The device of claim 16, wherein a detection distance of the doppler sensor is adjustable.

18. The device of claim 16, further comprising a communication module that enables two-way communication with an external device.

19. The device of claim 1, wherein the pushbutton is further configured to interrupt power to the lock control device when depressed.

* * * * *